(No Model.)
J. DICKASON.
NUT LOCK.
No. 553,780. Patented Jan. 28, 1896.
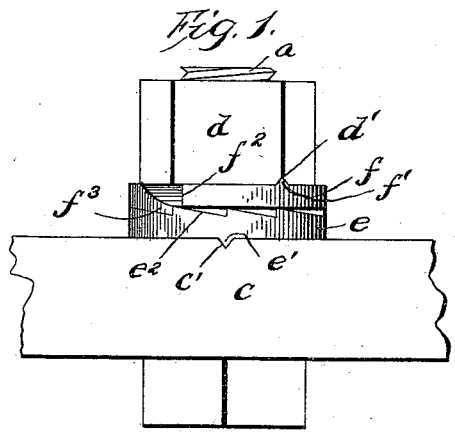
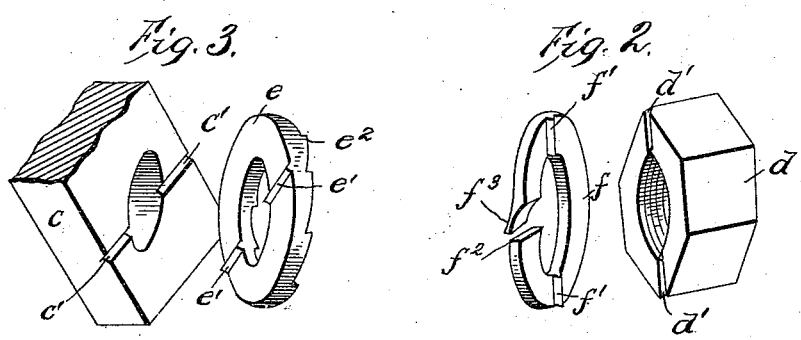
Witnesses
E. C. Duffy
C. M. Werle
Inventor
J. Dickason
per J. E. Duffy
Attorney

UNITED STATES PATENT OFFICE.

JONATHAN DICKASON, OF AGOSTA, OHIO.

NUT-LOCK.

SPECIFICATION forming part of Letters Patent No. 553,780, dated January 28, 1896.

Application filed September 3, 1895. Serial No. 561,185. (No model.)

*To all whom it may concern:*

Be it known that I, JONATHAN DICKASON, of Agosta, in the county of Marion and State of Ohio, have invented certain new and useful Improvements in Nut-Locks; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to certain improvements in nut-locks.

The object of the invention is to produce an improved nut-lock simple and durable and effective in construction and composed of a minimum number of parts and which can be employed in all ordinary connections with usual nuts and bolts and can be easily and readily applied without the necessity of skilled mechanics.

The invention consists in certain novel features of construction and in combinations and arrangements of parts more fully and particularly described and pointed out hereinafter.

Referring to the accompanying drawings, Figure 1 is a side elevation of the lock shown locking a nut. Fig. 2 is a detail perspective of the nut and pawl-washer, showing the under face of the nut and upper or outer face of the pawl-washer. Fig. 3 is a detail perspective of the ratchet-washer and a portion of the body against which it locks, showing the under face of said washer.

In the drawings, $a$ is the bolt of any desirable construction.

$c$ is the body through which the bolt passes, having the usual bolt-hole and the two opposite grooves or depressions $c'$ $c'$ radiating from diametrically-opposite sides of the bolt-hole.

$d$ is the nut of any shape or construction to fit the bolt, and on its under side having the radiating grooves, seats, or depressions $d'$ $d'$, radiating from opposite sides of the bolt-hole through the outer edges of the nut.

$e$ is a ratchet-washer with the central hole to receive the bolt and at its under side formed to fit on the outer face of the body $c$, and having the two radiating ribs $e'$ $e'$ on its under face extending from opposite sides of the bolt-hole to the edge of the washer and formed to fit in the depressions $c'$ $c'$ and thereby hold the washer locked against rotation and enabling it to be easily dropped into or removed from place without requiring accurate adjustment or great care. The opposite or outer face of the washer is formed with the circular series of ratchet-teeth $e^2$ around the bolt-hole.

$f$ is a pawl-washer, usually corresponding in shape and size to the ratchet-washer, and on its outer flat surface formed to fit against the under side of the nut and there provided with the two radiating ribs $f'$ $f'$, extending from opposite sides of the bolt-hole to the edge of the washer and formed to fit in the grooves $d'$ $d'$ of the nut and thereby lock the washer to turn with the nut. At any desirable point the washer has the radial cut $f^2$ from its bolt-hole through the edge of the washer, and the portion of the washer at one side of the cut or opening is reduced or cut away and formed into the downwardly-extending spring pawl or lip $f^3$, arranged to slip over the ratchet-teeth of the ratchet-washer as the nut is screwed down, so that when the nut is screwed home and the washer tightly pressed together the said pawl will prevent loosening rotation of the pawl-washer and consequently the nut.

The simplicity, durability, and effectiveness of the lock are clearly obvious.

What I claim is—

The nut-lock composed of a bolt $a$, a body $c$, having the two opposite grooves or depressions $c'$ $c'$, radiating from diametrically-opposite sides of the bolt-hole, the ratchet-washer $e$, provided on its under surface with the radiating ribs $e'$ adapted to fit in depressions $c'$, in the body $c$, the circular series of ratchet-teeth $e^2$ on its outer surface, the pawl-washer $f$, formed with the radial cut $f^2$ from its bolt-hole through the edge of the washer, and the reduced or cut-away portion forming the downwardly-extending pawl or lip $f^3$ to slip over the ratchet-teeth of the ratchet-washer, the ribs $f'$ on the outer side of the washer $f$ and extending from opposite sides of the bolt-hole to the edge of said washer, and a nut $d$, on its under side provided with radiating seats or depressions $d'$ radiating from opposite sides of the bolt-hole through the outer edges of the nut for connection with the ribs $f'$ of pawl-washer $f$, as set forth.

In testimony that I claim the foregoing as my own I affix my signature in presence of two witnesses.

JONATHAN DICKASON.

Witnesses:
E. F. GRIM,
C. L. CAREY.